United States Patent [19]

Hamada

[11] Patent Number: 5,447,329
[45] Date of Patent: Sep. 5, 1995

[54] AIR-BAG DEVICE INCLUDING PROTECTIVE SHEET

[75] Inventor: Shinji Hamada, Ayase, Japan
[73] Assignee: Ikeda Bussan Co., Ltd., Ayase, Japan
[21] Appl. No.: 258,494
[22] Filed: Jun. 10, 1994
[30] Foreign Application Priority Data Sep. 3, 1993 [JP] Japan .................... 5-243996

[51] Int. Cl.6 ............................ B60R 21/20
[52] U.S. Cl. ................... 280/728.1; 280/728.3
[58] Field of Search ........... 280/728 R, 728 A, 728 B, 280/731, 732, 743 R

[56] References Cited

U.S. PATENT DOCUMENTS

| | | | |
|---|---|---|---|
| 3,778,085 | 12/1973 | Lipkin | 280/728 A |
| 4,770,439 | 9/1988 | Maier | 280/728 A |
| 5,060,972 | 10/1991 | Satoh et al. | 280/728 B |
| 5,062,664 | 11/1991 | Bishop et al. | 280/728 A |
| 5,084,122 | 1/1992 | Fukushima et al. | 280/728 B |
| 5,217,254 | 6/1993 | Satoh | 280/728 A |

FOREIGN PATENT DOCUMENTS

| | | | |
|---|---|---|---|
| 56-43890 | 10/1981 | Japan . | |
| 61-185642 | 11/1986 | Japan . | |
| 2-158444 | 6/1990 | Japan | 280/728 A |
| 4-27639 | 1/1992 | Japan . | |

Primary Examiner—Karin L. Tyson
Attorney, Agent, or Firm—Foley & Lardner

[57] ABSTRACT

An air-bag device comprises an air-bag proper, an air-bag housing structure for receiving the air-bag proper, and inflating device for inflating the air-bag proper under a given condition. The air-bag housing structure has an easily breakable portion which is pushed and broken by the air-bag proper when the air-bag proper is inflated. An air-bag projection sheet is employed, which protects the air-bag proper from making a direct abutment with the easily breakable portion upon inflation of the air-bag proper.

5 Claims, 1 Drawing Sheet

AIR-BAG DEVICE INCLUDING PROTECTIVE SHEET

BACKGROUND OF THE INVENTION

1. Field of the Invention

The present invention relates in general to supplemental restraining devices for use in wheeled motor vehicles, and more particularly to, an air-bag device which, upon a vehicle collision, is instantly inflated with gas to protect a passenger. More specifically, the present invention is concerned with air-bag devices of a type which comprises generally an air-bag housing mounted inside of an associated motor vehicle, a gas generator fixed to a base plate of the air-bag housing, and an air-bag proper connected through a retainer to the base plate and having a gas inlet opening through which the gas from the gas generator can enter the air-bag upon a vehicle collision.

2. Description of the Prior Art

Hitherto, various types of air-bag devices have been proposed and put into practical use particularly in the field of passenger motor vehicles. Some of them are shown in Japanese Patent Second Provisional Publication 56-43890, Japanese Utility Model First Provisional Publication 61-185642 and Japanese Patent First Provisional Publication 4-27639.

However, due to their inherent constructions, some of the conventional air-bag devices including those shown in the above-mentioned publications sometimes fail to exhibit their satisfied performance.

SUMMARY OF THE INVENTION

It is therefore an object of the present invention to provide an air-bag device which can always exhibit a satisfied performance.

According to a first aspect of the present invention, there is provided an air-bag device which comprises an air-bag proper; an air-bag housing structure for receiving the air-bag proper; inflating means for inflating the air-bag proper under a given condition; first means for defining in the air-bag housing structure an easily breakable portion which is pushed and broken by the air-bag proper when the air-bag proper is inflated; and second means for protecting the air-bag proper from making a direct abutment with the easily breakable portion upon inflation of the air-bag proper.

According to a second aspect of the present invention, there is provided an arrangement in a motor vehicle having a dash board. The arrangement comprises means for defining in the dash board a first easily breakable portion; and an air-bag device comprising an air-bag proper; an air-bag housing structure for receiving the air-bag proper, the air-bag housing structure being positioned near the first easily breakable portion; inflating means for inflating the air-bag proper under a given condition; means for defining in the air-bag housing structure a second easily breakable portion which is pushed and broken by the air-bag proper when the air-bag proper is inflated, the second easily breakable portion positioned near and facing the first easily breakable portion; and means for protecting the air-bag proper from making a direct abutment with the first and second easily breakable portions upon inflation of the air-bag proper.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
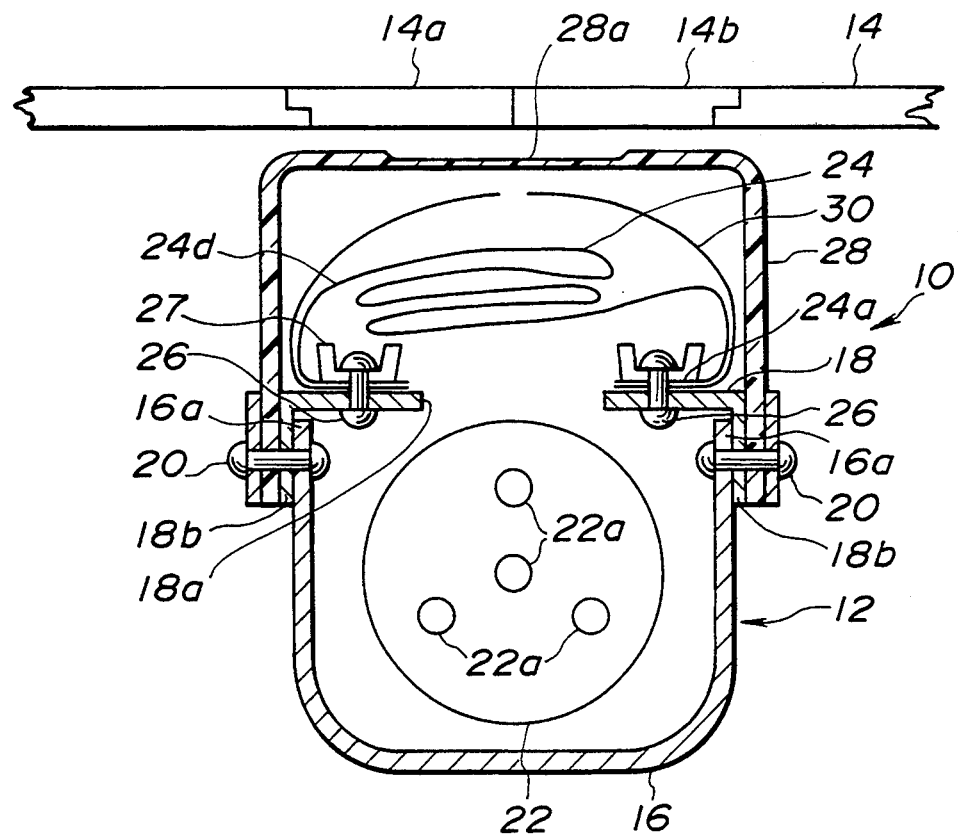
FIG. 1 is a sectional view of an air-bag device according to the present invention.

Referring to the accompanying drawings, particularly FIG. 1, there is shown an air-bag device according to the present invention, which is generally designated by numeral 10. The air-bag device 10 shown is designed to be mounted in front of a front passenger's seat.

As is seen from FIG. 1, the air-bag device 10 comprises an air-bag housing 12 which is installed in a back space of a dashboard 14 of an associated motor vehicle. The dashboard 14 is formed with a pair of lids 14a and 14b which are usually closed, as shown.

The air-bag housing 12 comprises a bucket-like container 16 and an apertured and flanged cover 18. The aperture of the cover 18 is rectangular in shape and designated by numeral 18a and the flange of the same is designated by numeral 18b. The container 16 is so oriented that an open end 16a thereof faces toward the paired lids 14a and 14b of the dash board 14. The apertured cover 18 is put on the open end 16a of the container 16 having the flange 18b thereof secured to the container 16 through bolts 20, as shown.

Within the container 16, there is installed a gas generator 22. Although not shown in the drawings, the gas generator 22 has a so-called trigger means which, upon sensing a vehicle collision, actuates the gas generator 22 to generate a certain amount of gas. Designated by numerals 22a are gas outlet nozzles of the gas generator 22.

An air-bag proper 24 is folded in a space defined between the cover 18 of the air-bag housing 12 and the paired lids 14a and 14b of the dash board 14. The air-bag proper 24 has a mouth portion 24a which is secured to the apertured cover 18 through bolts 26. With this, the interior of the air-bag proper 24 and that of the container 16 are fluidly communicated. Thus, upon enegization of the gas generator 22, the gas therefrom is instantly led into the air-bag proper 24 through the aperture 18a of the cover 18 and instantly inflates the air-bag proper 24.

Figure 2:
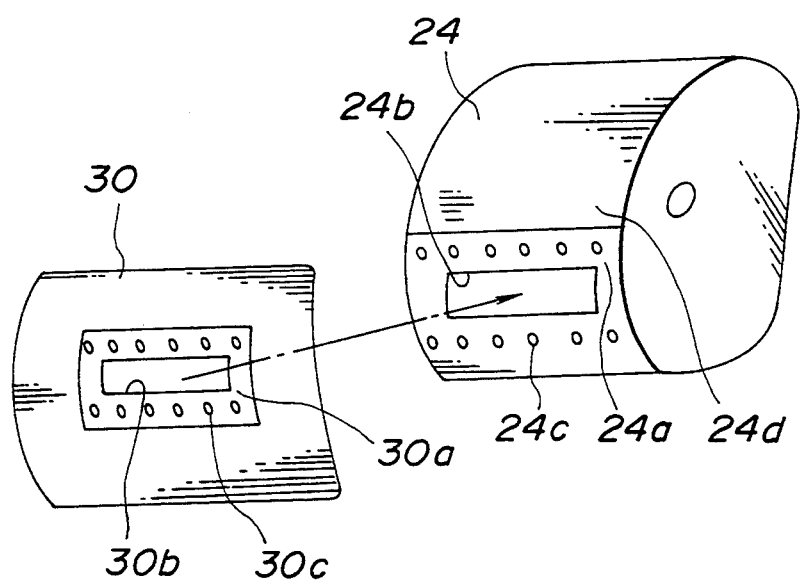
FIG. 2 is a view showing two major parts of the air-bag device of the present invention.

As will be seen from FIG. 2, the mouth portion 24a of the air-bag proper 24 has a rectangular mouth 24b. The mouth portion 24a is reinforced by a rectangular patch (no numeral) and formed with a plurality of bolt openings 24c. The bolt openings 24c receive the bolts 26 for achieving the connection of the air-bag proper 24 to the air-bag housing 12.

Referring back to FIG. 1, an air-bag cap 28 is anchored by the bolts 20, which covers the folded air-bag proper 24. The air-bag cap 28 is constructed of a plastic or the like. Upon inflation of the air-bag proper 24, the air-bag cap 28 is easily broken by the force of the inflating air-bag proper 24. For this purpose, the air-bag cap 28 is formed with a thinner and thus easily breakable portion 28a.

As is understood from the drawings, a rectangular protection sheet 30 is arranged to cover a base portion 24d of the air-bag proper 24, which base portion 24d surrounds the mouth portion 24a of the air-bag proper 24. The protection sheet 30 has a generally middle portion 30a secured to the apertured cover 18 through the bolts 26. For the purpose which will become apparent hereinafter, the protection sheet 30 is so sized as to substantially cover the entire of the inner surface of the air-bag cap 28. As is seen from FIG. 2, the middle portion 30a of the protection sheet 30 has a rectangular mouth 30b. The middle portion 30a is reinforced by a rectangular patch (no numeral) and formed with a plurality of bolt openings 30c through which the bolts 26 pass.

That is, upon assembly, the middle portion of the protection sheet 30 and the mouth portion 24a of the air-bag proper 24 are put on together and both are secured to the apertured cover 18 of the air-bag housing 12 by means of the bolts 26 which pass through the bolt openings 30c and 24c.

Designated by numeral 27 in FIG. 1 is a rectangular retainer which is used for assuring the tight connection of both the air-bag proper 24 and the protection sheet 30 to the apertured cover 18. If desired, between the middle portion of the protection sheet 30 and the mouth portion 24a of the air-bag proper 24, there may be applied a rubber coating for assuring much tight connection of both the air-bag proper 24 and the protection sheet 30 to the apertured cover 18.

In the following, operation will be described.

When, due to a vehicle collision, the gas generator 22 is energized, the same generates a certain amount of gas. The gas is instantly led into the air-bag proper 24 to inflate the same. During inflation of the air-bag proper 24, the same breaks the easily breakable portion 28a of the air-bag cap 28 and opens the paired lids 14a and 14b of the dash board 14 and is exposed to the outside of the dash board 14. With this, a seat occupant sitting in front of the air-bag device 10 is protected by the inflated air-bag proper 24.

In the following, advantages provided by the present invention will be described.

Upon inflation of the air-bag proper 24, the protection sheet 30 is forced to swing outward and thus abut against the broken parts of the air-bag cap 28 and the paired lids 14a and 14b. That is, the protection sheet 30 can protect the air-bag proper 24 from making a direct abutment against such broken parts. If the inflating air-bag proper 24 abuts against such broken parts, the same would be damaged. While, in the present invention, such direct abutment does not occur, and thus the air-bag proper 24 can exhibit its performance sufficiently.

Second, since connection of both the air-bag proper 24 and the air-bag protection sheet 35 to the apertured cover 18 is made by means of bolts 26 and retainer 27, they can be easily assembled to and disassembled from the air-bag housing 12.

What is claimed is:

1. An air bag device comprising:

an air-bag proper;

an air-bag housing structure for receiving said air-bag proper in a contracted condition;

inflating means for inflating said air-bag proper under a given condition;

first means for defining in said air-bag housing structure an easily breakable portion which is to be pushed and broken by said air-bag proper when the air-bag proper is inflated; and second means for protecting said air-bag proper from making a direct abutment with said easily breakable portion upon inflation of said air-bag proper, wherein said second means includes a single protection sheet constructed of cloth, said protection sheet being received in said air-bag housing structure in a manner to cover said air-bag proper, said protection sheet including an apertured middle portion which is secured to a fixed part of the air-bag device and a free peripheral portion which substantially covers the entire inner surface of said easily breakable portion, and wherein the opening of said apertured middle portion of said protection sheet is mated with a gas inlet mouth of said air-bag proper.

2. An air-bag device as claimed in claim 1, in which a peripheral portion of said opening of said protection sheet and that of said gas inlet mouth of said air-bag proper are put on together and secured to an apertured cover of a container in which said inflating means is installed.

3. An air-bag device as claimed in claim 2, in which the peripheral portion of said opening of said protection sheet and that of said gas inlet mouth of said air-bag proper are both reinforced by respective patches.

4. An air-bag device as claimed in claim 3, in which said protection sheet is rectangular in shape.

5. An air-bag device as claimed in claim 1, in which said first means comprises an air-bag cap constructed of a plastic, said air-bag cap having a thinner wall portion which serves as said easily breakable portion.

* * * * *